US010323291B2

(12) United States Patent
Al-Ghamdi et al.

(10) Patent No.: US 10,323,291 B2
(45) Date of Patent: Jun. 18, 2019

(54) METHODS FOR UTILIZING OLEFIN COKE IN A STEEL MAKING PROCESS AND PRODUCTS MADE THEREFROM

(71) Applicant: SABIC Global Technologies B.V., Bergen op Zoom (NL)

(72) Inventors: Ahmad Al-Ghamdi, Jubail Industrial City (SA); Yousif Al-Dhafeery, Jubail Industrial City (SA); Abdulrasheed Jaffar, Jubail Industrial City (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/329,134

(22) PCT Filed: Jul. 14, 2015

(86) PCT No.: PCT/IB2015/001729
§ 371 (c)(1),
(2) Date: Jan. 25, 2017

(87) PCT Pub. No.: WO2016/016716
PCT Pub. Date: Feb. 4, 2016

(65) Prior Publication Data
US 2017/0204483 A1 Jul. 20, 2017

Related U.S. Application Data

(60) Provisional application No. 62/031,755, filed on Jul. 31, 2014.

(51) Int. Cl.
*C10L 5/00* (2006.01)
*C21B 5/00* (2006.01)
(Continued)

(52) U.S. Cl.
CPC ............. *C21B 5/007* (2013.01); *C10G 9/36* (2013.01); *C10L 5/00* (2013.01); *C21B 13/0066* (2013.01);
(Continued)

(58) Field of Classification Search
CPC .......................... C21B 5/007; C21B 13/0066; C21C 5/5211; C21C 7/0025; C21C 2300/02; C10L 5/00
See application file for complete search history.

(56) References Cited

U.S. PATENT DOCUMENTS 3,624,231 A  11/1971  Juel et al. ............... 106/456
3,836,353 A   9/1974  Holley .................... 75/479
(Continued)

FOREIGN PATENT DOCUMENTS

CN  1240224  1/2000
CN  1329173  1/2002
(Continued)

OTHER PUBLICATIONS

Jones, Jeremy AT, Ben Bowman, and Peter A. Lefrank. "Electric Furnace Steelmaking." The Making, Shaping, and Treating of Steel. pp. 525, 596, and 597. (Year: 1998).*
(Continued)

*Primary Examiner* — Tima M McGuthry-Banks
(74) *Attorney, Agent, or Firm* — Norton Rose Fulbright US LLP

(57) ABSTRACT

Methods and compositions for producing reduced carbon footprint steel compositions by providing a molten steel having a carbon content; and introducing a carbon containing agent into the molten steel. At least a portion of the carbon containing agent is a reclaimed olefin coke.

14 Claims, 6 Drawing Sheets

OLEFIN COKE A

OLEFIN COKE B (51) Int. Cl.
*C21C 5/52* (2006.01)
*C21C 7/00* (2006.01)
*C10G 9/36* (2006.01)
*C21B 13/00* (2006.01)

(52) U.S. Cl.
CPC .......... *C21C 5/5211* (2013.01); *C21C 7/0025* (2013.01); *C21C 7/0075* (2013.01); *C10G 2400/20* (2013.01); *C10L 2300/20* (2013.01); *Y02P 10/216* (2015.11)

(56) References Cited

U.S. PATENT DOCUMENTS

| | | | | |
|---|---|---|---|---|
| 3,841,849 | A * | 10/1974 | Beckmann | C10B 5/04 44/551 |
| 4,075,084 | A | 2/1978 | Skripek et al. | 208/93 |
| 4,165,221 | A | 8/1979 | Valenti | 44/26 |
| 4,388,175 | A * | 6/1983 | Lionetti | C10G 11/18 208/50 |
| 5,028,311 | A * | 7/1991 | Shigley | C10B 55/00 208/125 |
| 5,158,668 | A * | 10/1992 | Chahar | C10B 55/00 208/131 |
| 5,259,864 | A | 11/1993 | Greenwalt | 75/446 |
| 5,338,336 | A | 8/1994 | Greenwalt | 75/445 |
| 5,395,420 | A * | 3/1995 | Masucci | C21C 5/5264 420/116 |
| 5,558,696 | A | 9/1996 | Greenwalt | 75/505 |
| 5,630,862 | A | 5/1997 | Greenwalt | 75/445 |
| 5,833,735 | A | 11/1998 | Grandin et al. | 75/544 |
| 6,918,947 | B2 | 7/2005 | Maki et al. | 75/484 |
| 7,128,827 | B2 * | 10/2006 | Tallman | C10G 51/06 208/78 |
| 7,704,336 | B2 | 4/2010 | Noack | 148/538 |
| 7,709,436 | B2 | 5/2010 | Theiler et al. | 510/351 |
| 7,771,684 | B2 | 8/2010 | Constantz et al. | 423/220 |
| 7,785,447 | B2 | 8/2010 | Eatough et al. | 201/21 |
| 7,815,880 | B2 | 10/2010 | Constantz et al. | 423/220 |
| 8,070,849 | B2 | 12/2011 | Sahajwalla | 75/10 |
| 8,470,275 | B2 | 6/2013 | Constantz et al. | 423/220 |
| 8,545,593 | B2 | 10/2013 | Hoffman | 75/435 |
| 2002/0005089 | A1 | 1/2002 | Nagata et al. | 75/433 |
| 2006/0278042 | A1 | 12/2006 | Sugitatsu et al. | 75/560 |
| 2010/0313793 | A1 | 12/2010 | Constantz et al. | 423/220 |
| 2011/0044881 | A1 * | 2/2011 | Stansberry | C10G 1/04 423/448 |
| 2012/0036960 | A1 | 2/2012 | Hoffman | 75/435 |
| 2014/0060586 | A1 | 3/2014 | Hill | 134/22 |
| 2014/0109638 | A1 | 4/2014 | Aelion et al. | 44/628 |
| 2015/0141726 | A1 * | 5/2015 | Thakkar | C10G 45/02 585/330 |

FOREIGN PATENT DOCUMENTS

| | | |
|---|---|---|
| CN | 1523122 | 8/2004 |
| CN | 1786206 | 6/2006 |
| CN | 101688261 | 3/2010 |
| CN | 102216473 | 10/2011 |
| CN | 102703101 | 10/2012 |
| CN | 102732664 | 10/2012 |
| EP | 0976843 A1 | 2/2000 |
| EP | 2199365 A1 | 6/2010 |
| EP | 2794932 | 10/2014 |
| JP | S5825385 | 2/1983 |
| JP | 2001279338 A | 10/2001 |

OTHER PUBLICATIONS

Poppmeier, W.A.H. and W. Peters. "The use of carbonaceous materials in steelmaking." Journal of the Southern African Institute of Mining and Metallurgy (SAIMM). vol. 93, No. 7. pp. 177-182. (Year: 1993).*
Young, D. J. "Kinetic and morphological development of coke formation on heat-resistant alloys." Materials and Corrosion. vol. 50. pp. 675-680. (Year: 1999).*
Abghari, Sorood Zahedi. "Investigation of Coke Formation in Steam Cracking of Atmospheric Gasoil." Journal of Petroleum Science Research (JPSR) vol. 2, Issue 2. pp. 82-91. Apr. 2013.*
"Carbons for Steelmaking," PowerPoint presentation from Anthracite Industries—A Division of Asbury Carbons, dated May 21, 2014, pp. 1-20.
Alvarez, R., "Recycling of hazardous waste material in the coking process," Environmental science & technology 38(5): 1611-1615 Mar. 1, 2004.
Kopinke, FD., "Relative rates of coke formation from hydrocarbons in steam cracking of naphta. Parafifns, naphthenes, monoolefins, and cycloolefins, and acetylenes." Industrial& Engineering chemistry research 32 (1):56-61 Jan. 1993.
Wiedmann, T. et al., "A Definition of 'Carbon Footprint'," ISA UK Research Report, Jun. 2007, pp. 1-9.
Written Opinion and International Search Report from PCT/IB2015/001729, dated Feb. 4, 2016, 9 pages.
Xue, NH "Advances in research of the stability of molecular sieve catalysts for olefin cracking," Chinese journal of catalysis 29(9): p. 866-872 Sep. 2008 (English Abstract).
Office Action issued in Chinese Patent Application No. 201580053074. 4, dated Jul. 16, 2018.
Office action issued in corresponding Chinese Patent Application No. 201580053074.4, dated Jan. 9, 2019. (Machine Translation Provided).
Yong, Zhang "Adopting advanced clearing technology" Progress in Olefin Technology, China Petrochemical Press, Beijing, 2008 (English Translation of Relevant Section).

* cited by examiner

METHODS FOR UTILIZING OLEFIN COKE IN A STEEL MAKING PROCESS AND PRODUCTS MADE THEREFROM

CROSS-REFERENCE TO RELATED APPLICATIONS

This application is a national phase application under 35 U.S.C. § 371 of International Application No. PCT/IB2015/001729 filed 14 Jul. 2015, which claims priority to U.S. Provisional Patent Application No. 62/031,755 filed 31 Jul. 2014. The entire contents of each of the above-referenced disclosures is specifically incorporated by reference herein without disclaimer.

FIELD OF INVENTION

The present invention relates to methods and compositions for producing reduced carbon footprint steel by utilizing carbon containing by-products of olefin production.

BACKGROUND OF THE INVENTION

Steel is a metal alloy comprising iron and carbon. The iron in steel can be produced from iron oxide. However, the reduction of iron oxide to iron often requires input of large quantities of energy. Furthermore, in some processes of steel making, $CO_2$, a greenhouse gas, is produced as a by-product, for example, during the reduction of iron oxide to iron. Moreover, the fuel source and reactants in the reduction process are often coal or metallurgic coke, which are also known to contribute to an increased carbon footprint. In other processes, the reduction of iron oxide reaction can be achieved by using waste products and thus minimizing overall $CO_2$ release. There remains a need for improved processes and systems for producing reduced carbon footprint steel. This need and other needs are met by the various aspects of the present disclosure.

SUMMARY OF THE INVENTION

In accordance with the purposes of the invention, as embodied and broadly described herein, the invention relates to a method, comprising the steps of: a) providing a molten steel having a carbon content; and b) introducing a carbon containing recarburizing agent into the molten steel under conditions effective to provide a recarburized molten steel composition having an increased carbon content; wherein at least a portion of the carbon containing recarburizing agent comprises a reclaimed olefin coke.

In another exemplary aspect, the invention relates to a method, comprising the steps of: a) forming a molten steel having a carbon content; and b) introducing a carbon containing recarburizing agent into the molten steel under conditions effective to provide a recarburized molten steel composition having an increased carbon content; wherein at least a portion of the carbon containing recarburizing agent comprises a reclaimed olefin coke; and wherein the method has a reduced carbon footprint that is less than a reference carbon footprint of a substantially identical reference method that utilizes a substantially identical amount of a reference recarburizing agent, and wherein the reference recarburizing agent only contains coal, metallurgic coke, or calcined petroleum coke (CPC).

In another exemplary aspect, the invention relates to a method, comprising: a) forming a molten steel in an electric arc furnace; b) introducing a carbon containing foaming agent into the molten steel under conditions effective to form a slag layer and a refined molten steel composition; and c) separating at least portion of the refined molten steel composition from the slag layer; wherein at least a portion of the carbon containing foaming agent comprises a reclaimed olefin coke.

In another exemplary aspect, the invention relates to a method, comprising: a) forming a molten steel composition in an electric arc furnace; b) introducing a carbon containing foaming agent into the molten steel under conditions effective to form a slag layer and a refined molten steel composition; and c) separating at least portion of the refined molten steel composition; wherein at least a portion of the carbon containing foaming agent comprises a reclaimed olefin coke; wherein the method has a reduced carbon footprint that is less than a reference carbon footprint of a substantially identical reference method that utilizes a substantially identical amount of a reference foaming agent, and wherein the reference foaming agent only contains coal, metallurgic coke, or calcined petroleum coke (CPC).

In further aspects, the invention also relates to compositions, comprising: a) a first coke component comprising a reclaimed olefin coke; and b) a second coke component comprising coal or metallurgical coke.

In further aspects, the invention also relates to articles comprising the disclosed steel compositions and steel compositions made using the disclosed methods and compositions.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated in and constitute a part of this specification, illustrate several aspects and together with the description serve to explain the principles of the invention.

DETAILED DESCRIPTION OF THE INVENTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, exemplary methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. DEFINITIONS

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a carbon-containing material" includes mixtures of two or more carbon-containing materials.

As used herein, the term "combination" is inclusive of blends, mixtures, alloys, reaction products, and the like.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

As used herein, the terms "ppm" and "parts per million" are used interchangeably and refer to a unit of measure of the amount of disclosed elements in the total composition in terms of a ratio between the number of parts of disclosed elements to a million parts of the total composition.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. However, it should be understood that an appropriate effective amount will be readily determined by one of ordinary skill in the art using only routine experimentation.

As used herein, the terms "foamy slag layer," "slag layer," or "slag" can be used interchangeably and refer to a by-product of the steelmaking process, which separates the desired metal fraction from the unwanted fraction. For example and without limitation, in some aspects of the invention, for exemplary purposes slag can comprise metal oxides, limestone, or dolomite, or any combination thereof. In still further aspects of the invention, the slag can further comprise any one or more impurities present in steelmaking raw materials.

As used herein, the term "substantially identical reference method" refers to a method comprising substantially identical steps to the inventive method, performed under substantially identical conditions to the inventive condition, and using substantially the same proportions of components but using a substitute for of a stated component. For example and without limitation, in some aspects of the invention, for purposes of comparison to a corresponding reference method, as used herein, corresponding reference method comprising essentially the same steps as the inventive method using only coal, metallurgic coke, or calcined petroleum coke (CPC), or stated alternatively, in the absence of using a carbon containing by-product of an olefin production process.

Each of the materials disclosed herein are either commercially available and/or the methods for the production process thereof are known to those of ordinary skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

B. METHODS FOR PRODUCING STEEL

Conventional iron and steel making technologies are always energy intensive where large quantities of fuel are used to provide the needed energy to heat as well as to promote the chemical reactions necessary to reduce iron oxide to iron. Conventional fuel sources for these processes are mainly coal or metallurgic coke. A negative aspect of using coal or metallurgic coke in the steel making process is that they provide a large carbon footprint. Moreover, the carbon footprint for metallurgical coke production is about 0.56 ton $CO_2$ per ton coke produced, to which must also be added the carbon footprint for transportation from the site of coke production to the steel making site. The negative carbon footprint is likely to be considerably more if the distance between the metallurgical coke production site and the steel making operation is considerable. For example, there is about 0.163 kg $CO_2$ produced per ton-km for transportation of aggregate materials over roadways.

As briefly described above, the present disclosure relates, in one aspect, to a method for producing steel. In one aspect, the method comprising the steps of: a) providing a molten steel having a carbon content; and b) introducing a carbon containing recarburizing agent into the molten steel under conditions effective to provide a recarburized molten steel composition having an increased carbon content; wherein at least a portion of the carbon containing recarburizing agent comprises a reclaimed olefin coke.

During olefin cracking operations, catalytic or pyrolytic coke is co-produced. Such coke that accumulates in the radiant tubes of the steam cracker negatively impact the cracking process, thus decoking is required at regular intervals. The waste coke generated is typically disposed of in landfills.

In one aspect, the reclaimed olefin coke is catalytic or pyrolytic coke, or a combination thereof. In a further aspect, the reclaimed olefin coke is catalytic coke. In a still further aspect, the reclaimed olefin coke is pyrolytic coke.

In a further aspect, the reclaimed olefin coke is a by-product of a olefin production process. In a still further aspect, the olefin production process is steam cracking of olefins. In a yet further aspect, the olefin production process comprises production of ethylene, propylene, or a combination thereof.

In a further aspect, the reclaimed olefin coke comprises at least about 75 wt % carbon. In still further aspect, the reclaimed olefin coke comprises a total carbon content present in an amount in the range from greater than about 80 wt % to less than about 100 wt % based on the total weight of the reclaimed olefin coke, including exemplary values of greater than about 85 wt %, greater than about 90 wt %, greater than about 95 wt %, or greater than about 99 wt %. In still further aspects, a total carbon content is present in exemplary amounts of less than about 100 wt %, less than about 98 wt %, less than about 95 wt %, less than about 90 wt %, or less than about 85 wt %. In still further aspects, the reclaimed olefin coke can comprise a total carbon content in an amount in any range derived from any two of the above listed exemplary values. For example, the reclaimed olefin coke can comprise a total carbon content that is present in an amount ranging from about 77 wt % to about 92.0 wt %, based on the total weight of the reclaimed olefin coke. In still another aspect, the reclaimed olefin coke can comprise a total carbon content in an amount ranging from about 80 wt % to 91 wt %, based on the total weight of the reclaimed olefin coke.

In a further aspect, the reclaimed olefin coke comprises less than or equal to about 1 wt % sulfur, including exemplary values of about 0.05 wt %, 0.1 wt %, 0.15 wt %, 0.2 wt %, 0.25 wt %, 0.3 wt %, 0.35 wt %, 0.40 wt %, 0.45 wt %, 0.50 wt %, 0.55 wt %, 0.60 wt %, 0.65 wt %, 0.70 wt %, 0.75 wt %, 0.80 wt %, 0.85 wt %, 0.90 wt %, and 0.95 wt %. In still further aspects, the reclaimed olefin coke can comprise sulfur present in any range derived from any two of the above listed exemplary values. For example, the reclaimed olefin coke can comprise sulfur present in an amount ranging from about 0.13 wt % to about 0.95 wt % based on the total weight of the reclaimed olefin coke.

In another aspect, the present disclosure relates to a method for the production of steel with a decreased carbon footprint. For example, production of steel utilizing a pre-existing carbon source, i.e. catalytic or pyrolytic coke, offsets the requirement for the use of coal and metallurgical coke in the overall steel-making process, thus decreasing the carbon footprint of steel production. In one aspect, the present disclosure provides a method, comprising the steps of: a) forming a molten steel having a carbon content; and b) introducing a carbon containing recarburizing agent into the molten steel under conditions effective to provide a recarburized molten steel composition having an increased carbon content; wherein at least a portion of the carbon containing recarburizing agent comprises a reclaimed olefin coke; and wherein the method has a reduced carbon footprint that is less than a reference carbon footprint of a substantially identical reference method that utilizes a substantially identical amount of a reference recarburizing agent, and wherein the reference recarburizing agent only contains coal, metallurgic coke, or calcined petroleum coke (CPC).

In one aspect, the reduced carbon footprint is characterized as at least 0.56 ton $CO_2$ less than the reference carbon footprint per ton of reclaimed olefin coke introduced into the molten steel.

In one aspect, the reclaimed olefin coke is catalytic or pyrolytic coke, or a combination thereof. In a further aspect, the reclaimed olefin coke is catalytic coke. In a still further aspect, the reclaimed olefin coke is pyrolytic coke.

In a further aspect, the reclaimed olefin coke is a by-product of a olefin production process. In a still further aspect, the olefin production process is steam cracking of olefins. In a yet further aspect, the olefin production process comprises production of ethylene, propylene, or a combination thereof.

In a further aspect, the reclaimed olefin coke comprises at least about 75 wt % carbon. In still further aspect, the reclaimed olefin coke comprises a total carbon content present in an amount in the range from greater than about 80 wt % to less than about 100 wt % based on the total weight of the reclaimed olefin coke, including exemplary values of greater than about 85 wt %, greater than about 90 wt %, greater than about 95 wt %, or greater than about 99 wt %. In still further aspects, a total carbon content is present in exemplary amounts of less than about 100 wt %, less than about 98 wt %, less than about 95 wt %, less than about 90 wt %, or less than about 85 wt %. In still further aspects, the reclaimed olefin coke can comprise a total carbon content in an amount in any range derived from any two of the above listed exemplary values. For example, the reclaimed olefin coke can comprise a total carbon content that is present in an amount ranging from about 77 wt % to about 92.0 wt %, based on the total weight of the reclaimed olefin coke. In still another aspect, the reclaimed olefin coke can comprise a total carbon content in an amount ranging from about 80 wt % to 91 wt %, based on the total weight of the reclaimed olefin coke.

In a further aspect, the reclaimed olefin coke comprises less than or equal to about 1 wt % sulfur, including exemplary values of about 0.05 wt %, 0.1 wt %, 0.15 wt %, 0.2 wt %, 0.25 wt %, 0.3 wt %, 0.35 wt %, 0.40 wt %, 0.45 wt %, 0.50 wt %, 0.55 wt %, 0.60 wt %, 0.65 wt %, 0.70 wt %, 0.75 wt %, 0.80 wt %, 0.85 wt %, 0.90 wt %, and 0.95 wt %. In still further aspects, the reclaimed olefin coke can comprise sulfur present in any range derived from any two of the above listed exemplary values. For example, the reclaimed olefin coke can comprise sulfur present in an amount ranging from about 0.13 wt % to about 0.95 wt % based on the total weight of the reclaimed olefin coke.

In another aspect, the present disclosure provides a method, comprising: a) forming a molten steel in an electric arc furnace; b) introducing a carbon containing foaming agent into the molten steel under conditions effective to form a slag layer and a refined molten steel composition; and c) separating at least portion of the refined molten steel composition from the slag layer; wherein at least a portion of the carbon containing foaming agent comprises a reclaimed olefin coke.

In another aspect, the present disclosure provides a method, comprising: a) forming a molten steel composition in an electric arc furnace; b) introducing a carbon containing foaming agent into the molten steel under conditions effective to form a slag layer and a refined molten steel composition; and c) separating at least portion of the refined molten steel composition; wherein at least a portion of the carbon containing foaming agent comprises a reclaimed olefin coke; wherein the method has a reduced carbon footprint that is less than a reference carbon footprint of a substantially identical reference method that utilizes a substantially identical amount of a reference foaming agent, and wherein the reference foaming agent only contains coal, metallurgic coke, or calcined petroleum coke (CPC).

In one aspect, the underlying steel making process comprises the same or similar steps as in the steel making process utilizing a conventional electric arc furnace (EAF). In various aspects of this invention, the electric arc furnace is used for melting materials that has been fed into the furnace. In one aspect, and as one of ordinary skill in the art would appreciate, the energy required for melting in the electric arc furnace, is introduced by means of an electric current via one or more electrodes, and the heat is transferred to the metallic charge via an electric arc. In various aspects of the invention, the materials fed into the electric arc furnace have to avoid contact with the electrodes and damage the same when charging the furnace.

In another aspect, these steps comprise a melting step, a refining step, and a tapping step. In a further aspect, the steel making process comprises liquefying the steel, the tapping in the ladle, and transferring to the ladle processing station. In an even further aspect, the steel making process comprises the process parameters as used in the conventional electric arc furnace (EAF), such as temperature, residence time, reactors, pressure, and additional ingredients, when using reclaimed olefin coke.

In one aspect, the molten steel can have any desired composition. In one aspect, the molten steel comprises a metallic iron, iron oxides, carbon, phosphor, sulfur, silicon oxide, aluminum oxide, nitrogen, a gangue, or any combination thereof. In one aspect, the iron oxides present in the direct reduced iron can further comprise an oxide of Fe(II), an oxide of Fe(III), and an oxide of Fe(II, III), or any combination thereof.

In one aspect, the reclaimed olefin coke is generated from an olefin production process, for example, during steam cracking. In another aspect, the reclaimed olefin coke is generated by accumulation in the radiant tubes or coils of the steam cracker. In a further aspect, the reclaimed olefin coke is produced by decoking the olefin coke from the radiant tubes of the steam cracker.

In one aspect, the reclaimed olefin coke have a particle size from about 0.01 mm to about 150 mm, including exemplary values of about 0.02 mm, 0.05 mm, 0.07 mm, 0.1 mm, 0.5 mm, 0.7 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 110 mm, 120 mm, 130 mm, and about 140 mm. In yet another aspect, the reclaimed olefin coke have a particle size of less than or equal to about 150 mm, less than or equal to about 125 mm, less than or equal to about 100 mm, less than or equal to about 50 mm, less than or equal to about 25 mm, less than or equal to about 1 mm. In still further aspects, the reclaimed olefin coke have a particle size in any range derived from any two of the above listed exemplary values. For example, the particle size can be in the range from about 0.01 mm to about 135 mm. In still another aspect, the particle size can be in any range from about 1 mm to about 100 mm. In one aspect, the particle size can be measure according to various standard methods available in the art.

In one aspect, the reclaimed olefin coke have an average particle size from about 0.01 mm to about 12 mm, including exemplary values of about 0.02 mm, 0.05 mm, 0.07 mm, 0.1 mm, 0.5 mm, 0.7 mm, 1 mm, 2 mm, 3 mm, 4 mm, 5 mm, 6 mm, 7 mm, 8 mm, 9 mm, 10 mm, and about 11 mm. In yet another aspects, the reclaimed olefin coke have an average particles size of less than or equal to about 6 mm, less than or equal to about 5 mm, less than or equal to about 4 mm, less than or equal to about 3 mm, less than or equal to about 2 mm, less than or equal to about 1 mm. In still further aspects, the reclaimed olefin coke have an average particles size in any range derived from any two of the above listed exemplary values. For example, the average particles size can be in the range from about 0.01 mm to about 3.5 mm. In still another aspect, the average particle size can be in any range from about 0.1 mm to about 6 mm. In some aspects, the reclaimed olefin coke can comprise substantially small fines with an average size equal or less than about 6 mm. In other aspects, the reclaimed olefin coke can comprise larger fines with an average size equal or greater than about 6 mm.

In one aspect and according to the methods disclosed herein, an iron or steel feed and feed of a carbon containing agent can be introduced into the furnace separately, or in combination, using a conveyor belt, baskets, fine injection, or any combination thereof. In one aspect, the iron or steel feed comprising steelmaking raw materials can be introduced into the furnace using a conveyor belt. In another aspect, the carbon feed containing reclaimed olefin coke can be introduced into the furnace using a conveyor belt. In yet another aspect, the materials can be fed into the furnace by any means known to one of ordinary skill in the art. In some aspects, the carbon containing agent is a carbon containing recarburizer agent. In other aspects, the carbon containing agent is a carbon containing foaming agent.

In various aspects of this invention, the methods for producing the steel compositions comprises providing an iron or steel feed comprising steelmaking raw materials and introducing the iron or steel feed into a furnace. In one aspect, the furnace is a blast furnace (BF), a basic oxygen furnace (BOF), or an electric arc furnace (EAF), or any combination thereof. In another aspect, the furnace is an electric arc furnace. In various aspects of this invention, the electric arc furnace is used for melting materials that has been fed into the furnace. In one aspect, and as one of ordinary skill in the art would appreciate, the energy required for melting in the electric arc furnace, is introduced by means of an electric current via one or more electrodes, and the heat is transferred to the metallic charge via an electric arc. In various aspects of the invention, the materials fed into the electric arc furnace have to avoid contact with the electrodes and damage the same when charging the furnace.

In one aspect, methods for producing the steel compositions comprise introducing an iron or steel feed comprising steelmaking raw materials into an empty furnace. In another aspect, the methods can further comprise bringing the furnace to conditions effective to provide a molten steel. In one aspect, conditions effective to provide the molten steel comprise melting down the introduced feed by means of igniting the electrodes in the electric arc furnace. In another aspect, conditions effective to provide the molten steel comprise bringing the furnace to a temperature in the range from about 1,400° C. to about 1,700° C., including exemplary values of about 1,420° C., 1,450° C., 1,480° C., 1,500° C., 1,520° C., 1,550° C., 1,580° C., 1,600° C., 1,620° C., 1,650° C., and about 1,680° C. In still further aspects, the furnace can be brought to a temperature in any range derived from any two of the above listed exemplary values. For example, the furnace temperature can be in the range from about 1,450° C. to about 1,650° C. In still another aspect, the temperature can be in the range from about 1,550° C. to about 1,700° C. It should also be appreciated that the furnace can be maintained at the desired temperature or range of temperatures for any desired period of time. Such durations will be readily known to one of ordinary skill in the art in view of this disclosure.

In various aspects of this invention, the carbon containing agent is injected into the molten steel by any means known to one of ordinary skill in the art. In one aspect, the carbon containing agent is injected by means of a charging tube. In one aspect, the carbon containing agent comprises a carbon containing recarburizing agent, wherein at least a portion of the carbon containing recarburizing agent comprises a reclaimed olefin coke. In another aspect, the carbon containing agent comprises a carbon containing foaming agent, wherein at least a portion of the carbon containing foaming agent comprises a reclaimed olefin coke.

In one aspect, the charging tube can comprise a downpipe, a lance, a compressed-fine wire, or any combination thereof. In various aspects of this invention, the lance can have any conventionally configured orifice known to one of ordinary skill in the art, as long as the orifice aperture has no corners and sharp-edged transitions. In a further aspect, at least one lance can be used to inject the carbon containing agent. In a yet further aspect, two or more lances can be used to inject the carbon containing agent. In various aspects of this invention, the carbon containing agent comprise reclaimed olefin coke.

In one aspect, the lance utilized in this invention can have an internal diameter in the range from about 30 to about 1500 mm, including exemplary values of about 40 mm, 50 mm, 60 mm, 70 mm, 80 mm, 90 mm, 100 mm, 120 mm, 150 mm, 180 mm, 200 mm, 250 mm, 300 mm, 400 mm, 500 mm, 600 mm, 700 mm, 800 mm, 900 mm, 1000 mm, 1100 mm, 1200 mm, 1300 mm, or about 1400 mm. In still further aspects, the internal diameter of the lance can be in any range derived from any two of the above listed exemplary values. For example, the internal diameter can be in the range from about 30 mm to about 100 mm. In still another aspect, the internal diameter can be in the range from about 300 mm to about 600 mm. In a further aspect and without limitation, if two or more lances are used, each of the lances can have the same or a different internal diameter.

In one aspect, the carbon containing agent comprising reclaimed olefin coke can be injected through the lance by means of gravity. In another aspect, at least one pneumatic lance can be used. In yet another aspect, any combination of pneumatic and gravity based lances can be used. In a further aspect, two or more pneumatic lances can be used.

In one aspect, the carbon containing agent comprising reclaimed olefin coke can be injected into the molten steel without a carrier gas. In another aspect, the carbon containing agent comprising reclaimed olefin coke can be injected into the molten steel using a carrier gas. In one aspect, the carrier gas can comprise a carbon feed, inert gas, or any combination thereof. In one aspect, an exemplary inert gas that can be used includes argon. In yet another aspect and without limitation, the carbon feed can be gaseous, solid, or liquid. An exemplary carbon feed gas can include carbon dioxide. In one aspect, the carbon containing agent comprising reclaimed olefin coke can be injected into the molten steel in combination with other feeds. In a further aspect, the carbon containing agent comprising reclaimed olefin coke can be injected into the molten steel in combination with other feeds, wherein the carbon containing agent and the other feeds are injected using separate lances, and wherein the lances can comprise pneumatic lances.

In one aspect, and as one of ordinary skill in the art would readily appreciate, the lance used to inject the carbon containing agent comprising reclaimed olefin coke can be positioned in the furnace in any direction, or location effective to produce a desired steel. In one aspect, the lance can be positioned vertically. In another aspect, the lance can be positioned in such a way that a lance orifice is kept above a foamy layer slag, such that the carbon containing agent comprising reclaimed olefin coke can be dispensed above the foamy slag. In yet another aspect, the lance can be positioned in such a way that a lance orifice is within a foamy layer slag, such that the carbon containing agent comprising reclaimed olefin coke can be dispensed within the foamy slag. In further aspects, the lance can be positioned in such a way that a lance orifice is within the molten steel, such that carbon containing agent comprising reclaimed olefin coke can be dispensed within the molten steel. In these aspects, the lance can be positioned within the molten steel at a depth below the liquid steel surface in the range of from, for example, about 30 mm to about 1500 mm, including exemplary values of about 50 mm, 100 mm, 200 mm, 300 mm, 400 mm, 500 mm, 600 mm, 700 mm, 800 mm, 900 mm, 1000 mm, 1100 mm, 1200 mm, 1300 mm, and about 1400 mm. In still further aspects, the lance can be positioned in the molten steel at a depth below the molten steel surface in any range derived from any two of the above listed exemplary values. For example, the depth can be in the range from about 50 mm to about 300 mm. In still another aspect, the depth can be in the range from about 600 mm to about 1000 mm.

In various other aspects of this invention, the lance can be positioned at an angle of from about 20° to about 70° relatively to the horizontal axis of the molten steel. In one aspect, the lance can be positioned at exemplary angles of about 25°, 30°, 35°, 40°, 45°, 50°, 55°, 60°, and about 65° to the horizontal axis of the molten steel. In still further aspects, the lance can be positioned at any angle in any range derived from any two of the above listed exemplary values. For example, the lance can be positioned at an angle of from about 30° to about 50°. In still another aspect, the lance can be positioned at an angle of from about 40° to about 70°. In a yet further aspect, the lance can be positioned at an angle of about 45° relatively to the horizontal axis of the molten steel.

In a further aspect, the lance can be positioned at an angle from about 20° to about 70° to the horizontal axes of the molten steel, wherein the lance is inserted in the molten steel at a depth below the liquid steel surface in the range from about 30 mm to about 1500 mm. In a yet further aspect, the lance can be positioned at exemplary angles of about 25°, 30°, 35°, 40°, 45°, 50°, 55°, 60°, and about 65° to the horizontal axes of the molten steel, wherein the lance is inserted in the molten steel at exemplary depth values in the range from about 30 mm to about 1500 mm, including exemplary values of about 50 mm, 100 mm, 200 mm, 300 mm, 400 mm, 500 mm, 600 mm, 700 mm, 800 mm, 900 mm, 1000 mm, 1100 mm, 1200 mm, 1300 mm, and about 1400 mm. In still further aspects, the lance can be positioned at any angle, and inserted at any depth in any range derived from any two of the above listed exemplary values. For example, the lance can be positioned at an angle of from about 30° to about 50°, wherein the lance is inserted at a depth below the molten steel surface in the range from about 50 mm to about 300 mm. In still another aspect, the lance can be positioned at an angle of from about 40° to about 70°, wherein the lance is inserted at a depth below the molten steel surface in the range from about 600 mm to about 1000 mm. In a yet further aspect, the lance can be positioned at an angle of about 45°, wherein the lance is inserted at a depth below the molten steel surface in the range from about 600 mm to about 1000 mm.

In various aspects of this invention and according to the methods described herein, a carbon containing recarburizing agent comprising reclaimed olefin coke is introduced into a molten steel having a carbon content. In a further aspect, the molten steel is subjected to conditions effective to provide a recarburized molten steel composition having an increased carbon content, wherein the method has a reduced carbon footprint that is less than a reference carbon footprint of a substantially identical reference method that utilizes a substantially identical amount of a reference recarburizing agent, and wherein the reference recarburizing agent only contains coal, metallurgic coke, or calcined petroleum coke (CPC). For example, the recarburized molten steel composition can exhibit a higher carbon content than the carbon content of the molten steel prior to introduction of the recarburizer agent. In a still further aspect, the recarburizing agent is introduced into the molten steel at a melt furnace or ladle furnace.

In various further aspects of this invention and according to the methods described herein, a carbon containing foaming agent comprising reclaimed olefin coke is introduced into a molten steel. In a further aspect, the molten steel is subjected to conditions effective to provide a slag layer and a refined molten steel composition, wherein the method has a reduced carbon footprint that is less than a reference carbon footprint of a substantially identical reference method that utilizes a substantially identical amount of a reference foaming agent, and wherein the reference foaming agent only contains coal, metallurgic coke, or calcined petroleum coke (CPC). For example, the refined molten steel composition can exhibit a lower impurity content than the impurity content of the molten steel prior to introduction of the foaming agent. In a further aspect, at least a portion of iron oxide present in the slag layer is reduced to iron.

In still further aspects, conditions effective to provide can comprise heating the furnace under a general atmospheric air environment. In another aspect, conditions effective to provide can further comprise heating the furnace in a controlled environment that comprises one or more additional gases. In yet another aspect, the one or more gases can comprise an oxygen containing gas, a carbon feed, a noble gas, or any combination thereof.

In one aspect, the molten steel is provided in a melting furnace. In a further aspect, the molten steel is provided in a blast oxygen furnace, induction furnace, or electric arc furnace.

C. STEEL COMPOSITIONS

Also disclosed herein are steel compositions formed by the methods described above. In one aspect, the present disclosure provides a steel composition produced by the process of: a) providing a molten steel having a carbon content; and b) introducing a carbon containing recarburizing agent into the molten steel under conditions effective to provide a recarburized molten steel composition having an increased carbon content; wherein at least a portion of the carbon containing recarburizing agent comprises a reclaimed olefin coke.

In another aspect, the present disclosure provides a steel composition produced by the process of: a) forming a molten steel having a carbon content; and b) introducing a carbon containing recarburizing agent into the molten steel under conditions effective to provide a recarburized molten steel composition having an increased carbon content; wherein at least a portion of the carbon containing recarburizing agent comprises a reclaimed olefin coke; and wherein the method has a reduced carbon footprint that is less than a reference carbon footprint of a substantially identical reference method that utilizes a substantially identical amount of a reference recarburizing agent, and wherein the reference recarburizing agent only contains coal, metallurgic coke, or calcined petroleum coke (CPC).

In another aspect, the present disclosure provides a steel composition produced by the process of: a) forming a molten steel in an electric arc furnace; b) introducing a carbon containing foaming agent into the molten steel under conditions effective to form a slag layer and a refined molten steel composition; and c) separating at least portion of the refined molten steel composition from the slag layer; wherein at least a portion of the carbon containing foaming agent comprises a reclaimed olefin coke.

In another aspect, the present disclosure provides a steel composition produced by the process of: a) forming a molten steel composition in an electric arc furnace; b) introducing a carbon containing foaming agent into the molten steel under conditions effective to form a slag layer and a refined molten steel composition; and c) separating at least portion of the refined molten steel composition; wherein at least a portion of the carbon containing foaming agent comprises a reclaimed olefin coke; wherein the method has a reduced carbon footprint that is less than a reference carbon footprint of a substantially identical reference method that utilizes a substantially identical amount of a reference foaming agent, and wherein the reference foaming agent only contains coal, metallurgic coke, or calcined petroleum coke (CPC).

In one aspect, the steel compositions formed by the methods described above can have a reduced carbon footprint compared to a reference steel composition produced by the reference method. In a further aspect, the steel composition carbon footprint is characterized as being at least 0.56 ton $CO_2$ less than the reference steel composition carbon footprint per ton of reclaimed olefin coke introduced into the molten steel.

In one aspect, the steel composition can comprise low, medium, or high carbon steel. In a further aspect, the steel composition can comprise cast iron compositional ranges.

D. COKE COMPOSITIONS

Also disclosed herein are compositions comprising the reclaimed olefin coke. In various aspects, the compositions comprising the reclaimed olefin coke can be utilized in the methods described above.

In one aspect, the present disclosure provides a composition, comprising, a) a first coke component comprising a reclaimed olefin coke; and b) a second coke component comprising coal or metallurgical coke.

In a further aspect, the reclaimed olefin coke is catalytic or pyrolytic coke, or a combination thereof. In a further aspect, the reclaimed olefin coke is catalytic coke. In a still further aspect, the reclaimed olefin coke is pyrolytic coke.

In a further aspect, the reclaimed olefin coke is a by-product of a olefin production process. In a still further aspect, the olefin production process is steam cracking of olefins. In a yet further aspect, the olefin production process comprises production of ethylene, propylene, or a combination thereof.

In a further aspect, the reclaimed olefin coke comprises at least about 75 wt % carbon. In still further aspect, the reclaimed olefin coke comprises a total carbon content present in an amount in the range from greater than about 80 wt % to less than about 100 wt % based on the total weight of the reclaimed olefin coke, including exemplary values of greater than about 85 wt %, greater than about 90 wt %, greater than about 95 wt %, or greater than about 99 wt %. In still further aspects, a total carbon content is present in exemplary amounts of less than about 100 wt %, less than about 98 wt %, less than about 95 wt %, less than about 90 wt %, or less than about 85 wt %. In still further aspects, the reclaimed olefin coke can comprise a total carbon content in an amount in any range derived from any two of the above listed exemplary values. For example, the reclaimed olefin coke can comprise a total carbon content that is present in an amount ranging from about 77 wt % to about 92.0 wt %, based on the total weight of the reclaimed olefin coke. In still another aspect, the reclaimed olefin coke can comprise a total carbon content in an amount ranging from about 80 wt % to 91 wt %, based on the total weight of the reclaimed olefin coke.

In a further aspect, the reclaimed olefin coke comprises less than or equal to about 1 wt % sulfur, including exemplary values of about 0.05 wt %, 0.1 wt %, 0.15 wt %, 0.2 wt %, 0.25 wt %, 0.3 wt %, 0.35 wt %, 0.40 wt %, 0.45 wt %, 0.50 wt %, 0.55 wt %, 0.60 wt %, 0.65 wt %, 0.70 wt %, 0.75 wt %, 0.80 wt %, 0.85 wt %, 0.90 wt %, and 0.95 wt %. In still further aspects, the reclaimed olefin coke can comprise sulfur present in any range derived from any two of the above listed exemplary values. For example, the reclaimed olefin coke can comprise sulfur present in an amount ranging from about 0.13 wt % to about 0.95 wt % based on the total weight of the reclaimed olefin coke.

In one aspect, the composition has a reduced carbon footprint that is less than a reference carbon footprint of a substantially identical reference composition that utilizes only contains coal, metallurgic coke, or calcined petroleum coke (CPC).

In a further aspect, the reduced carbon footprint is characterized as at least 0.56 ton $CO_2$ less than the reference carbon footprint per ton of reclaimed olefin coke introduced into the molten steel.

In one aspect, the composition is capable of functioning as a charging agent, foaming agent, or recarburizing agent. In a further aspect, the composition is capable of consuming oxygen in a furnace. In a still further aspect, the composition is capable of providing a reducing environment in a furnace. In a yet further aspect, the composition is capable of increasing carbon content in a steel composition.

In one aspect, the composition is capable of foaming a slag layer in a molten steel composition. In a further aspect, the composition is capable of reducing at least a portion of metallic oxides present in the slag layer to metal states. In a still further aspect, the composition is capable of reducing at least a portion of iron oxide present in the slag layer to iron metal.

E. ARTICLES OF MANUFACTURE

In various aspects, the disclosed steel compositions of the present invention can be used in manufacturing any desired articles currently formed from conventional steel materials. These articles of manufacture can include articles of any desired shape and/or size. Exemplary articles include, without limitation, long products, flat products or a combination thereof.

F. ASPECTS

In various aspects, the present invention pertains to and includes at least the following aspects.

Aspect 1: A method, comprising:
a) providing a molten steel having a carbon content; and
b) introducing a carbon containing recarburizing agent into the molten steel under conditions effective to provide a recarburized molten steel composition having an increased carbon content;
wherein at least a portion of the carbon containing recarburizing agent comprises a reclaimed olefin coke.

Aspect 2: The method of aspect 1, wherein the reclaimed olefin coke is catalytic or pyrolytic coke, or a combination thereof.

Aspect 3: The method of aspects 1-2, wherein the reclaimed olefin coke is a by-product of a olefin production process.

Aspect 4: The method of aspect 3, wherein the olefin production process is steam cracking of olefins.

Aspect 5: The method of aspects 3-4, wherein the olefin production process comprises production of ethylene, propylene, or a combination thereof.

Aspect 6: The method of aspects 1-5, wherein the reclaimed olefin coke comprises at least about 75 wt % carbon.

Aspect 7: The method of aspects 1-6, wherein the reclaimed olefin coke comprises less than or equal to about 1 wt % sulfur.

Aspect 8: The method of aspects 1-7, wherein the reclaimed olefin coke is catalytic coke.

Aspect 9: The method of aspects 1-8, wherein the reclaimed olefin coke is pyrolytic coke.

Aspect 10: The method of aspects 1-9, wherein the molten steel is provided in a melting furnace.

Aspect 11: The method of aspects 1-9, wherein the molten steel is provided in a blast oxygen furnace, induction furnace, or electric arc furnace.

Aspect 12: The method of aspects 1-11, wherein the recarburizing agent is introduced into the molten steel at a melt furnace or ladle furnace.

Aspect 13: A method, comprising:
a) forming a molten steel having a carbon content; and
b) introducing a carbon containing recarburizing agent into the molten steel under conditions effective to provide a recarburized molten steel composition having an increased carbon content;
wherein at least a portion of the carbon containing recarburizing agent comprises a reclaimed olefin coke; and
wherein the method has a reduced carbon footprint that is less than a reference carbon footprint of a substantially identical reference method that utilizes a substantially identical amount of a reference recarburizing agent, and wherein the reference recarburizing agent only contains coal, metallurgic coke, or calcined petroleum coke (CPC).

Aspect 14: The method of aspect 13, wherein the reduced carbon footprint is characterized as at least 0.56 ton $CO_2$ less than the reference carbon footprint per ton of reclaimed olefin coke introduced into the molten steel.

Aspect 15: The method of aspect 13, wherein the reclaimed olefin coke is catalytic or pyrolytic coke, or a combination thereof.

Aspect 16: The method of aspect 13-14, wherein the reclaimed olefin coke is a by-product of a olefin production process.

Aspect 17: The method of aspect 16, wherein the olefin production process is steam cracking of olefins.

Aspect 18: The method of aspects 16-17, wherein the olefin production process comprises production of ethylene, propylene, or a combination thereof.

Aspect 19: The method of aspects 13-18, wherein the reclaimed olefin coke comprises at least about 75 wt % carbon.

Aspect 20: The method of aspects 13-19, wherein the reclaimed olefin coke comprises less than or equal to about 1 wt % sulfur.

Aspect 21: The method of aspects 13-20, wherein the reclaimed olefin coke is catalytic coke.

Aspect 22: The method of aspects 13-21, wherein the reclaimed olefin coke is pyrolytic coke.

Aspect 23: The method of aspects 13-22, wherein the molten steel is provided in a melting furnace.

Aspect 24: The method of aspects 13-22, wherein the molten steel is provided in a blast oxygen furnace, induction furnace, or electric arc furnace.

Aspect 25: The method of aspects 13-24, wherein the recarburizing agent is introduced into the molten steel at a melt furnace or ladle furnace.

Aspect 26: A method, comprising:
a) forming a molten steel in an electric arc furnace;
b) introducing a carbon containing foaming agent into the molten steel under conditions effective to form a slag layer and a refined molten steel composition; and
c) separating at least portion of the refined molten steel composition from the slag layer;
wherein at least a portion of the carbon containing foaming agent comprises a reclaimed olefin coke.

Aspect 27: The method of aspect 26, wherein the reclaimed olefin coke is catalytic or pyrolytic coke, or a combination thereof.

Aspect 28: The method of aspects 26-27, wherein the reclaimed olefin coke is a by-product of a olefin production process.

Aspect 29: The method of aspect 28, wherein the olefin production process is steam cracking of olefins.

Aspect 30: The method of aspects 28-29, wherein the olefin production process comprises production of ethylene, propylene, or a combination thereof.

Aspect 31: The method of aspects 26-30, wherein the reclaimed olefin coke comprises at least about 75 wt % carbon.

Aspect 32: The method of aspects 26-31, wherein the reclaimed olefin coke comprises less than or equal to about 1 wt % sulfur.

Aspect 33: The method of aspects 26-32, wherein the reclaimed olefin coke is catalytic coke.

Aspect 34: The method of aspects 26-33, wherein the reclaimed olefin coke is pyrolytic coke.

Aspect 35: The method of aspects 26-34, wherein at least a portion of iron oxide present in the slag layer is reduced to iron.

Aspect 36: A method, comprising:
a) forming a molten steel composition in an electric arc furnace;
b) introducing a carbon containing foaming agent into the molten steel under conditions effective to form a slag layer and a refined molten steel composition; and
c) separating at least portion of the refined molten steel composition;
wherein at least a portion of the carbon containing foaming agent comprises a reclaimed olefin coke; and wherein the method has a reduced carbon footprint that is less than a reference carbon footprint of a substantially identical reference method that utilizes a substantially identical amount of a reference foaming agent, and wherein the reference foaming agent only contains coal, metallurgic coke, or calcined petroleum coke (CPC).

Aspect 37: The method of aspect 36, wherein the reduced carbon footprint is characterized as at least 0.56 ton $CO_2$ less than the reference carbon footprint per ton of reclaimed olefin coke introduced into the molten steel.

Aspect 38: The method of aspect 36, wherein the reclaimed olefin coke is catalytic or pyrolytic coke, or a combination thereof.

Aspect 39: The method of aspects 36-37, wherein the reclaimed olefin coke is a by-product of a olefin production process.

Aspect 40: The method of aspect 39, wherein the olefin production process is steam cracking of olefins.

Aspect 41: The method of aspects 39-40, wherein the olefin production process comprises production of ethylene, propylene, or a combination thereof.

Aspect 42: The method of aspects 36-41, wherein the reclaimed olefin coke comprises at least about 75 wt % carbon.

Aspect 43: The method of aspects 36-42, wherein the reclaimed olefin coke comprises less than or equal to about 1 wt % sulfur.

Aspect 44: The method of aspects 36-43, wherein the reclaimed olefin coke is catalytic coke.

Aspect 45: The method of aspects 36-44, wherein the reclaimed olefin coke is pyrolytic coke.

Aspect 46: The method of aspects 36-44, wherein at least a portion of iron oxide present in the slag layer is reduced to iron.

Aspect 47: A steel composition produced by the process of claims 1-12.

Aspect 48: A steel composition produced by the process of aspects 13-25.

Aspect 49: The steel composition of aspect 48, wherein the steel composition has a reduced carbon footprint compared to a that of a reference steel composition produced by the reference method.

Aspect 50: The steel composition of aspect 49, wherein the steel composition carbon footprint is characterized as being at least 0.56 ton $CO_2$ less than the reference steel composition carbon footprint per ton of reclaimed olefin coke introduced into the molten steel.

Aspect 51: A steel composition produced by the process of aspects 26-35.

Aspect 52: A steel composition produced by the process of aspects 36-50.

Aspect 53: The steel composition of aspect 52, wherein the steel composition has a reduced carbon footprint compared to a reference steel composition produced by the reference method.

Aspect 54: The steel composition of aspect 53, wherein the steel composition carbon footprint is characterized as being at least 0.56 ton $CO_2$ less than the reference steel composition carbon footprint per ton of reclaimed olefin coke introduced into the molten steel.

Aspect 55: A composition, comprising:
a) a first coke component comprising a reclaimed olefin coke; and
b) a second coke component comprising coal or metallurgical coke.

Aspect 56: The composition of aspect 55, wherein the reclaimed olefin coke is catalytic or pyrolytic coke, or a combination thereof.

Aspect 57: The composition of aspects 55-56, wherein the reclaimed olefin coke is a by-product of a olefin production process.

Aspect 58: The composition of aspect 57, wherein the olefin production process is steam cracking of olefins.

Aspect 59: The composition of aspects 57-58, wherein the olefin production process comprises production of ethylene, propylene, or a combination thereof.

Aspect 60: The composition of aspects 55-59, wherein the reclaimed olefin coke comprises at least about 75 wt % carbon.

Aspect 61: The composition of aspects 55-60, wherein the reclaimed olefin coke comprises less than or equal to about 1 wt % sulfur.

Aspect 62: The composition of aspects 55-61, wherein the reclaimed olefin coke is catalytic coke.

Aspect 63: The composition of aspects 55-62, wherein the reclaimed olefin coke is pyrolytic coke.

Aspect 64: The composition of aspects 55-63, wherein the composition is capable of functioning as a charging agent, foaming agent, or recarburizing agent.

Aspect 65: The composition of aspects 55-63, wherein the composition is capable of consuming oxygen in a furnace.

Aspect 66: The composition of aspects 55-63, wherein the composition is capable of providing a reducing environment in a furnace.

Aspect 67: The composition of aspects 55-63, wherein the composition is capable of foaming a slag layer in a molten steel composition.

Aspect 68: The composition of aspect 67, wherein the composition is capable of reducing at least a portion of metallic oxides present in the slag layer to metal states.

Aspect 69: The composition of aspect 67, wherein the composition is capable of reducing at least a portion of iron oxide present in the slag layer to iron metal.

Aspect 70: The composition of aspects 55-63, wherein the composition is capable of increasing carbon content in a steel composition.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

G. EXPERIMENTAL

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Figure 1A:
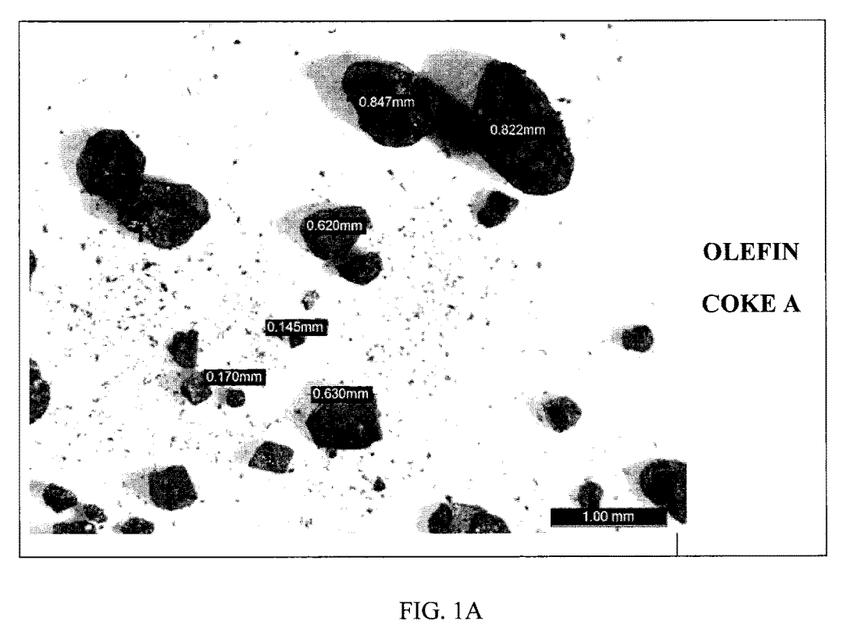
FIGS. 1A-1D are light microscope images showing particle size and morphology of four exemplary reclaimed olefin coke compositions of the present invention.
Figure 1B:
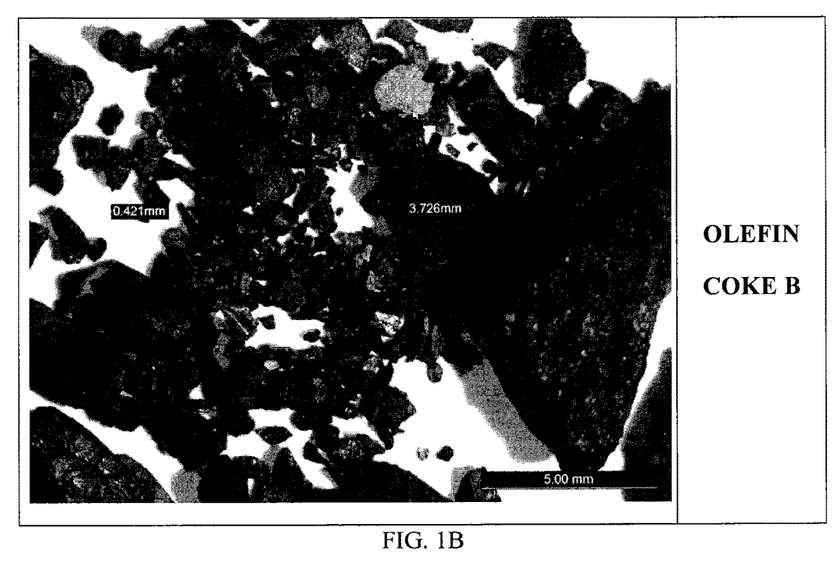
Figure 1C:
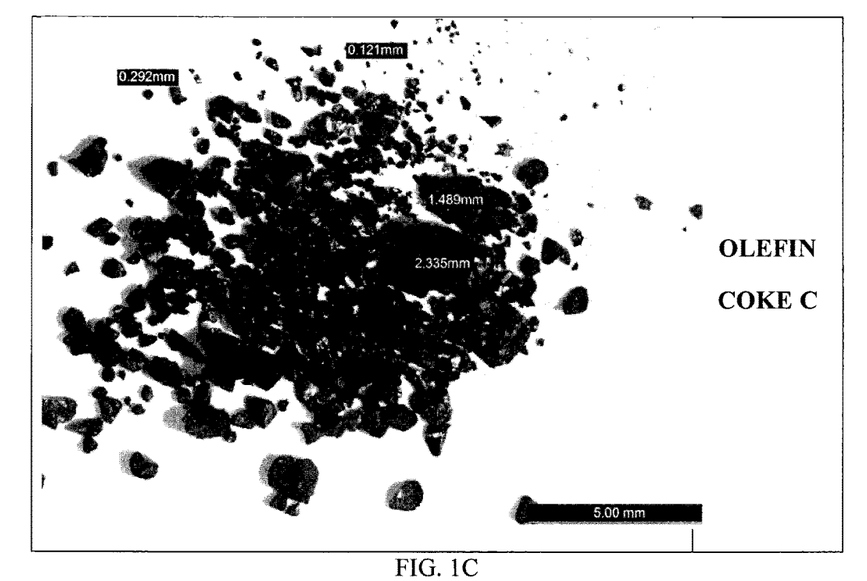
Figure 1D:
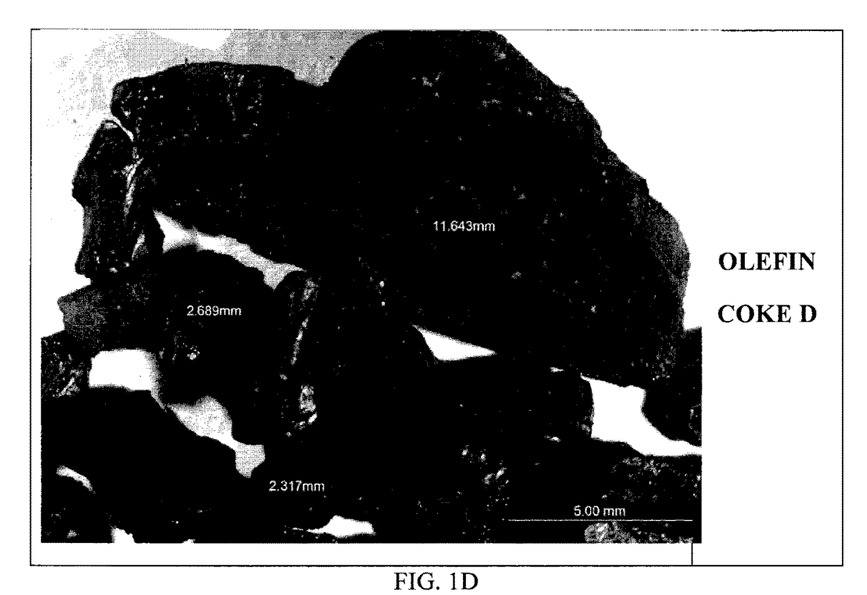

Compositional analysis was performed on four exemplary reclaimed olefin coke compositions of the present invention (FIGS. 1A-1D). First, the reclaimed olefin coke compositions were analyzed using XRF and Carbon/Sulfur analysis. Briefly, the data provides the percentage of each element present in each reclaimed olefin coke composition, as well as the possible formed compounds or oxides. The XRF and Carbon/Sulfur data for each of the reclaimed olefin coke compositions (olefin coke A, B, C, and D) are reported below in Tables 1-4, respectively.

TABLE 1

| Olefin Coke A | | | |
|---|---|---|---|
| Compound | Conc. % | Element | Conc. % |
| C | Balance | C | 91.1 |
|  |  | O | 2.645 |
| Na2O | 0.091 | Na | 0.068 |
| MgO | 0.0535 | Mg | 0.032 |
| Al2O3 | 0.103 | Al | 0.054 |
| SiO2 | 0.319 | Si | 0.1495 |
| P2O5 | 0.0093 | P | 0.004 |
| S | 0.2109 | S | 0.2109 |
| Cl | 0.0117 | Cl | 0.0117 |
| K2O | 0.0165 | K | 0.0135 |
| CaO | 0.1135 | Ca | 0.0812 |
| TiO2 | 0.0155 | Ti | 0.0093 |
| Cr2O3 | 0.9222 | Cr | 0.6307 |
| MnO | 0.0703 | Mn | 0.0544 |
| Fe2O3 | 5.7785 | Fe | 4.0405 |

TABLE 1-continued

| Olefin Coke A | | | |
|---|---|---|---|
| Compound | Conc. % | Element | Conc. % |
| NiO | 1.021 | Ni | 0.8019 |
| CuO | 0.0134 | Cu | 0.0107 |
| Br | 0.0122 | Br | 0.0122 |
| Nb2O5 | 0.0145 | Nb | 0.01 |
| MoO3 | 0.0275 | Mo | 0.018 |

TABLE 2

| Olefin Coke B | | | |
|---|---|---|---|
| Compound | Conc. % | Element | Conc. % |
| C | 79.1633 | C | 79.1633 |
|  |  | O | 5.6180 |
| MgO | 0.0310 | Mg | 0.0180 |
| Al2O3 | 0.5730 | Al | 0.3030 |
| SiO2 | 0.4670 | Si | 0.2180 |
| P2O5 | 0.0190 | P | 0.0083 |
| S | 0.0660 | S | 0.0660 |
| Cl | 0.0190 | Cl | 0.0190 |
| K2O | 0.0034 | K | 0.0028 |
| CaO | 0.1150 | Ca | 0.0824 |
| TiO2 | 0.0320 | Ti | 0.0190 |
| V2O5 | 0.0081 | V | 0.0045 |
| Cr2O3 | 1.9330 | Cr | 1.3230 |
| MnO | 0.0590 | Mn | 0.0460 |
| Fe2O3 | 7.1300 | Fe | 4.9870 |
| NiO | 9.8860 | Ni | 7.7680 |
| ZnO | 0.0077 | Zn | 0.0062 |
| Nb2O5 | 0.2890 | Nb | 0.2020 |
| MoO3 | 0.1600 | Mo | 0.1000 |

TABLE 3

| Olefin Coke C | | | |
|---|---|---|---|
| Compound | Conc. % | Element | Conc. % |
| C | 77.5500 | C | 77.5500 |
|  |  | O | 6.9360 |
| MgO | 0.0400 | Mg | 0.0240 |
| Al2O3 | 0.8730 | Al | 0.4620 |
| SiO2 | 0.8040 | Si | 0.3760 |
| P2O5 | 0.0210 | P | 0.0092 |
| S | 0.1330 | S | 0.1330 |
| Cl | 0.0240 | Cl | 0.0240 |
| K2O | 0.0200 | K | 0.0170 |
| CaO | 0.3230 | Ca | 0.2310 |
| TiO2 | 0.0200 | Ti | 0.0120 |
| V2O5 | 0.0025 | V | 0.0014 |
| Cr2O3 | 2.7540 | Cr | 1.8840 |
| MnO | 0.5040 | Mn | 0.3900 |
| Fe2O3 | 15.5800 | Fe | 10.8900 |
| NiO | 1.0420 | Ni | 0.8186 |
| ZnO | 0.0763 | Zn | 0.0613 |
| Nb2O5 | 0.0720 | Nb | 0.0510 |
| MoO3 | 0.1170 | Mo | 0.0777 |

TABLE 4

| Olefin Coke D | | | |
|---|---|---|---|
| Compound | Conc. % | Element | Conc. % |
| C | 96.7800 | C | 96.7800 |
|  |  | O | 0.9540 |
| MgO | 0.0170 | Mg | 0.0100 |
| Al2O3 | 0.0590 | Al | 0.0310 |
| SiO2 | 0.0790 | Si | 0.0370 |

TABLE 4-continued

| Olefin Coke D | | | |
|---|---|---|---|
| Compound | Conc. % | Element | Conc. % |
| P2O5 | 0.0110 | P | 0.0048 |
| S | 0.0290 | S | 0.0290 |
| Cl | 0.0044 | Cl | 0.0044 |
| K2O | 0.0019 | K | 0.0016 |
| CaO | 0.1410 | Ca | 0.1010 |
| TiO2 | 0.0055 | Ti | 0.0033 |
| V2O5 | 0.0004 | V | 0.0002 |
| Cr2O3 | 0.3210 | Cr | 0.2190 |
| MnO | 0.0210 | Mn | 0.0160 |
| Fe2O3 | 2.1410 | Fe | 1.4970 |
| NiO | 0.1720 | Ni | 0.1360 |
| ZnO | 0.1756 | Zn | 0.1411 |
| Nb2O5 | 0.0070 | Nb | 0.0049 |
| MoO3 | 0.0190 | Mo | 0.0130 |

As shown by the data, the carbon content in the reclaimed olefin coke compositions ranges from about 77% to about 96%. Furthermore, the sulfur content of all the reclaimed olefin coke compositions were found to be below 0.3%.

Figure 2:
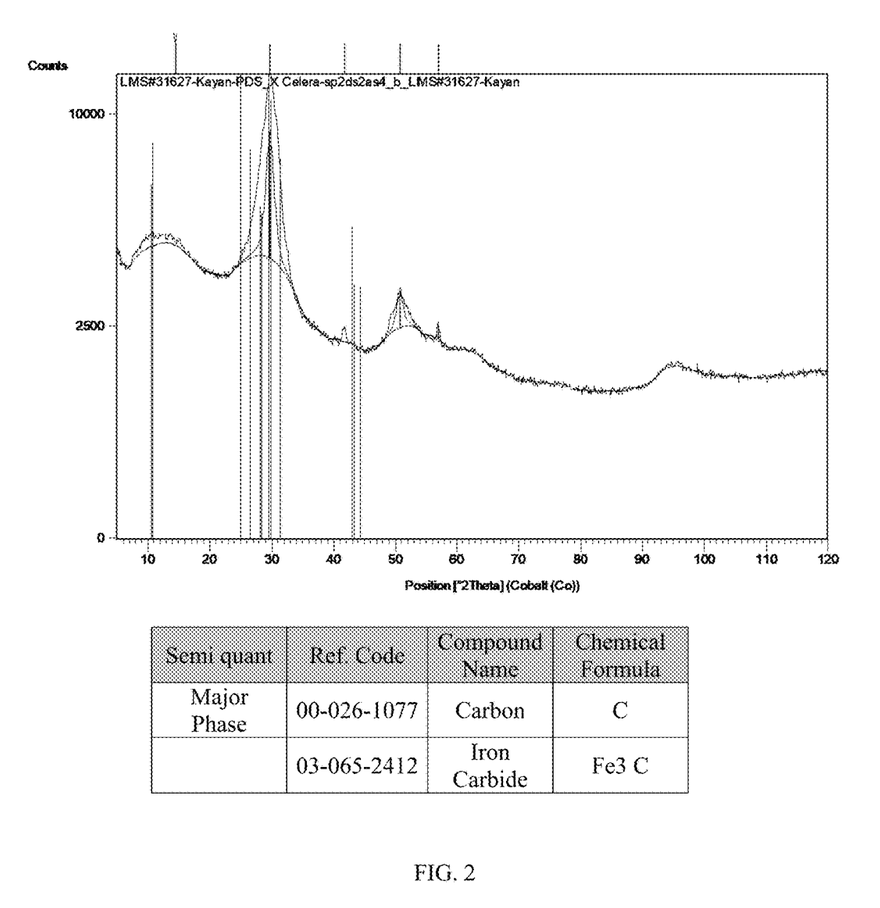
FIG. 2 shows a graph representing XRD data for an exemplary reclaimed olefin coke composition of the present invention.
Figure 3:
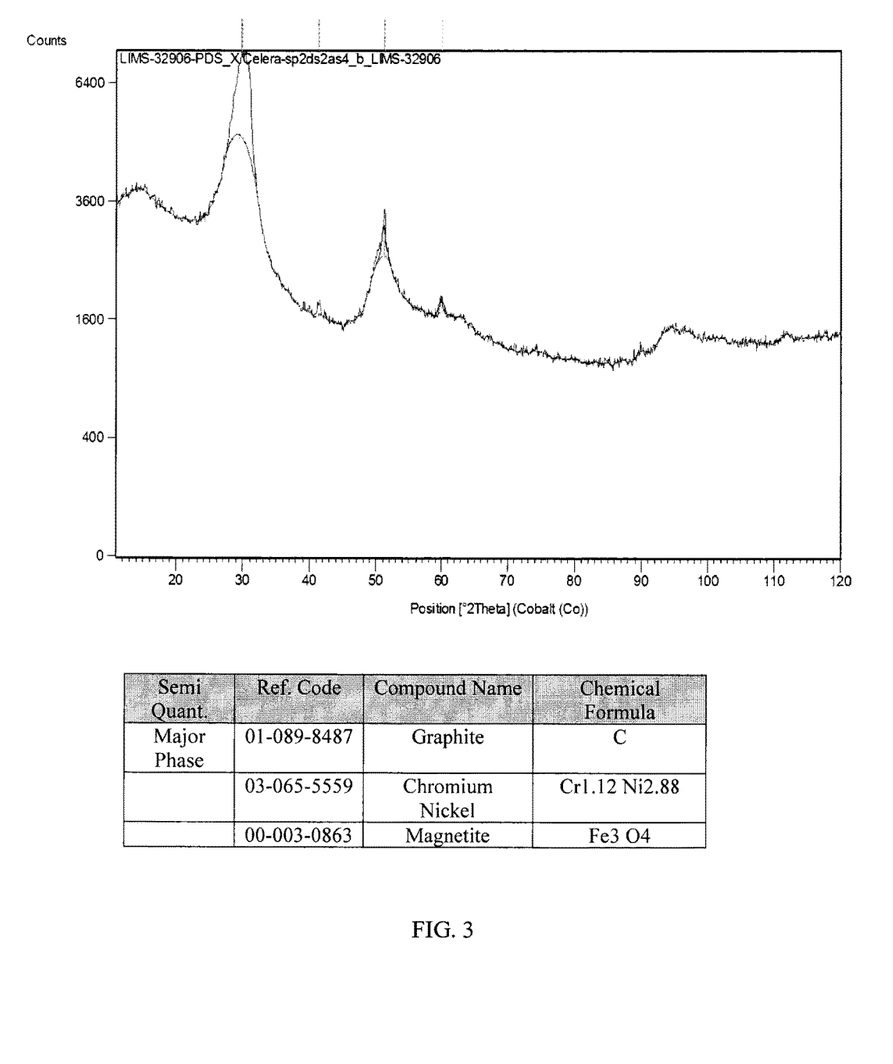
FIG. 3 shows a graph representing XRD data for an exemplary reclaimed olefin coke composition of the present invention.
Figure 4:
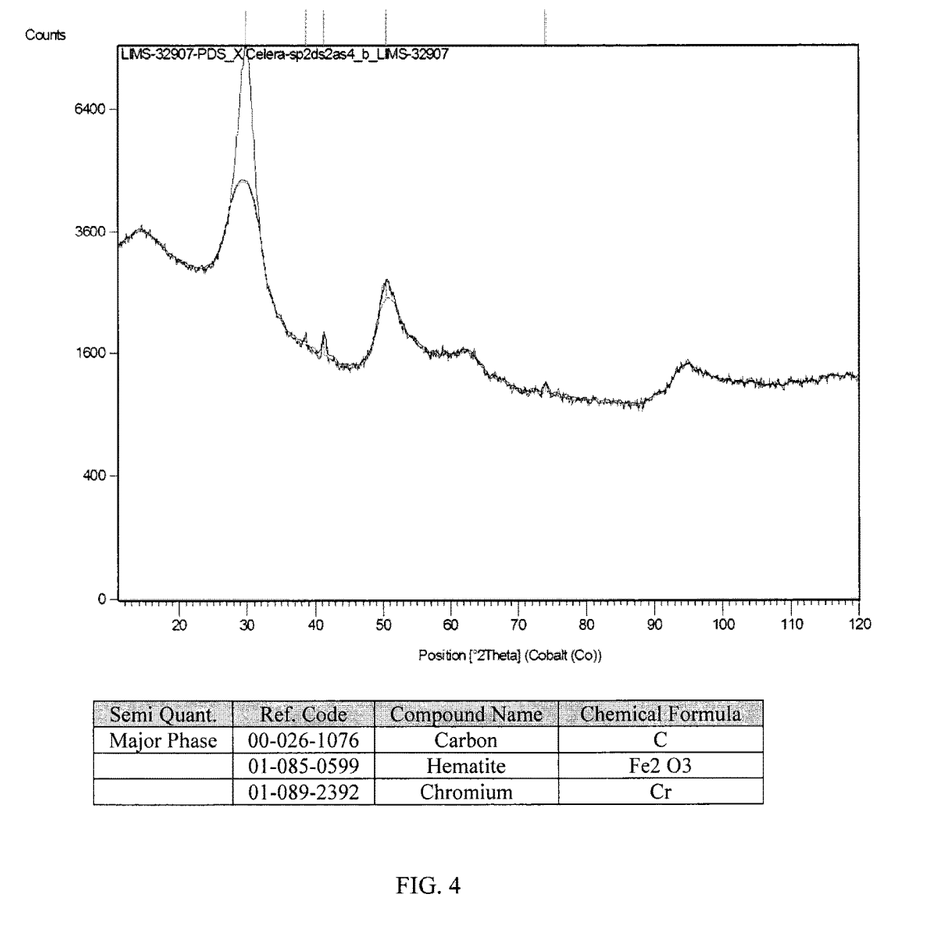
FIG. 4 shows a graph representing XRD data for an exemplary reclaimed olefin coke composition of the present invention.
Figure 5:
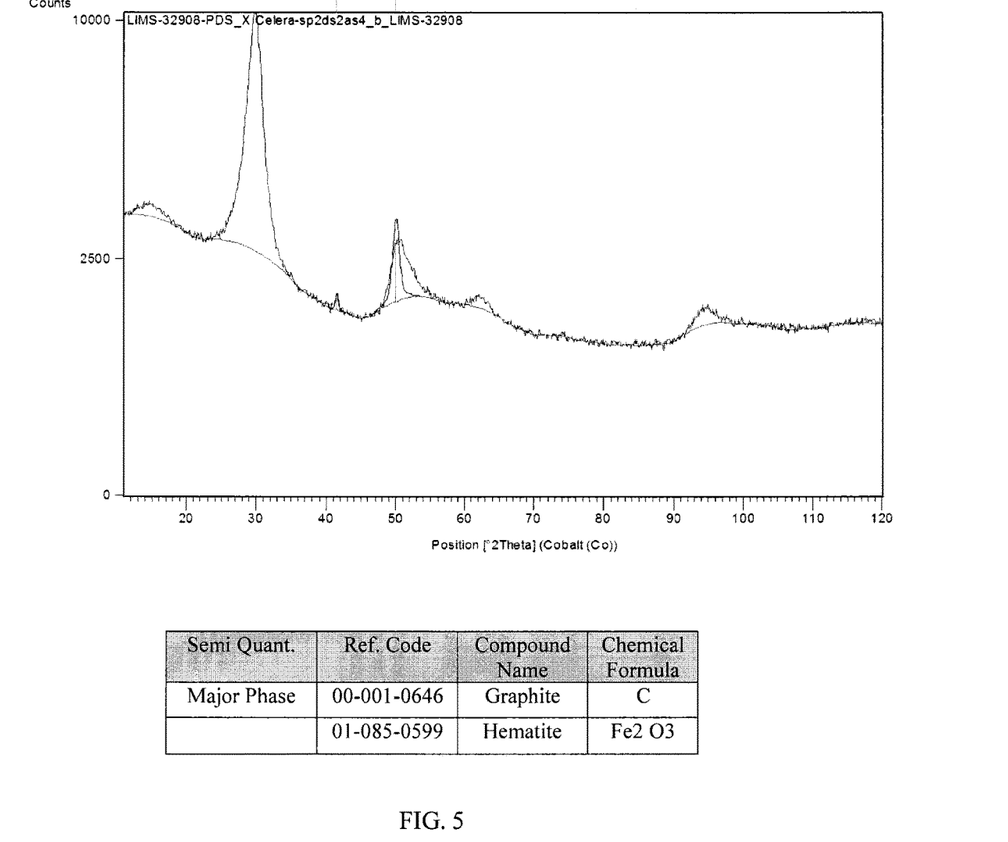
FIG. 5 shows a graph representing XRD data for an exemplary reclaimed olefin coke composition of the present invention.

XRD analysis was also performed on samples of the four reclaimed olefin coke compositions and used to identify potential crystalline compounds or elements in the reclaimed olefin coke compositions. The XRD data for each of the four reclaimed olefin coke compositions are reported in FIGS. 2-5. As shown by the XRD phase data, the reclaimed olefin coke samples indicated a small percentage of crystalline carbon or graphite as well as other crystalline phases such as hematite, magnetite and iron carbide.

Next, loss on ignition (LOI) testing was performed on the four reclaimed olefin coke compositions. Briefly, sequential loss on ignition (LOI) is a common and widely used method to estimate the organic and carbonate content of sediments. In a first reaction, organic matter is oxidized at 500-550° C. to carbon dioxide and ash. In a second reaction, carbon dioxide is evolved from carbonate at 900-1000° C., leaving oxide. The weight loss during the reactions is measured by weighing the samples before and after heating and is correlated to the organic matter and carbonate content of the reclaimed olefin coke compositions. The results of the LOI tests are reported in Table 5.

TABLE 5

| | Coke Sample | | | |
|---|---|---|---|---|
| | Olefin Coke A | Olefin Coke B | Olefin Coke C | Olefin Coke D |
| Organic Wt % | 0.9539 | 1.0136 | 7.2408 | 3.5239 |
| Inorganic Wt % | 25.055 | 18.9927 | 30.686 | 10.2874 |
| Total LOI Wt % | 26.009 | 20.0064 | 37.9268 | 13.8113 |

As shown by the data, the values for the total weight loss ranged from about 13 wt % to about 37 wt %. Also, the organic content reached a maximum of about 7 wt %.

Example 2

In this Example, various steel compositions were prepared using reclaimed olefin coke compositions of the present invention as described herein. Briefly, the reclaimed olefin coke composition was added during tapping of steel from the electric arc furnace into ladle and evaluated for added carbon or carbon recovery. The reclaimed olefin coke composition was provided as 15 kg bags. Prior to introduction of the reclaimed olefin coke composition and tapping, the carbon content of the steel (%) was determined using CELOX probes. Based on the steel grade and measured carbon content, the required amount of reclaimed olefin coke was then added to the steel. Next, the carbon content was measured at the ladle furnace and carbon recovery of added carbon (or carbon (%) pick-up) was determined. Performance results of the reclaimed olefin coke compositions performance in the various steel compositions are reported in Table 6.

TABLE 6

| Steel Grade | Tap Temp (C.) | Tap dissolve Oxygen (ppm) | Carbon (% C) b/f tapping | Tap wt (Ton) | Coke Add. in Ladle during tapping (kg) | LF Open Carbon (% C) | C-Pickup (% C) | % Recovery of added coke |
|---|---|---|---|---|---|---|---|---|
| 2300 | 1630 | 435 | 0.070% | 147.15 | 255 | 0.24% | 0.23% | 0.16% | 98.22% |
| 2100 | 1620 | 540 | 0.049% | 146.76 | 195 | 0.17% | 0.17% | 0.12% | 96.88% |
| 2300 | 1618 | 680 | 0.039% | 147.13 | 235 | 0.16% | 0.16% | 0.12% | 80.59% |
| 2100 | 1625 | 674 | 0.040% | 144.10 | 245 | 0.18% | 0.18% | 0.14% | 87.60% |

As seen by the data, the reclaimed olefin coke was able to increase the carbon content of the steel compositions. Moreover, the steel compositions were able to pick up a high percentage of the carbon added, which corresponded to % yield ranging from about 80 to about 98%.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way. Appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

What is claimed is:

1. A composition comprising:
   a) a first coke component comprising a reclaimed olefin coke; and b) a second coke component comprising coal or metallurgical coke, wherein the reclaimed olefin coke is a by-product of a olefin production process; and wherein the olefin production process is steam cracking of olefins.

2. The composition of claim 1, wherein the reclaimed olefin coke comprises at least about 75 wt % carbon.

3. The composition of claim 1, wherein the reclaimed olefin coke comprises less than or equal to about 1 wt % sulfur.

4. A method comprising the steps of:
a) providing a molten steel having a carbon content; and
b) introducing a carbon containing recarburizing agent into the molten steel under conditions effective to provide a recarburized molten steel composition having an increased carbon content;

wherein at least a portion of the carbon containing recarburizing agent comprises a reclaimed olefin coke, wherein the reclaimed olefin coke is a by-product of a olefin production process; and wherein the olefin production process is steam cracking of olefins.

5. The method of claim 4, wherein the olefin production process comprises production of ethylene, propylene, or a combination thereof.

6. The method of claim 4, wherein the reclaimed olefin coke comprises less than or equal to about 1 wt % sulfur.

7. The method of claim 4, wherein the molten steel is provided in a melting furnace.

8. The method of claim 4, wherein the molten steel is provided in a blast oxygen furnace, induction furnace, or electric arc furnace.

9. The method of claim 4, wherein the recarburizing agent is introduced into the molten steel at a melt furnace or ladle furnace.

10. The method of claim 4, wherein the method has a reduced carbon footprint that is less than a reference carbon footprint of a substantially identical reference method that utilizes a substantially identical amount of a reference recarburizing agent, and wherein the reference recarburizing agent only contains coal or metallurgic coke.

11. A method comprising the steps of:
a) forming a molten steel in an electric arc furnace;
b) introducing a carbon containing foaming agent into the molten steel under conditions effective to form a slag layer and a refined molten steel composition; and
c) separating at least portion of the refined molten steel composition from the slag layer;

wherein at least a portion of the carbon containing foaming agent comprises a reclaimed olefin coke, wherein the reclaimed olefin coke is a by-product of a olefin production process; and wherein the olefin production process is steam cracking of olefins.

12. The method according to claim 11, wherein the method has a reduced carbon footprint that is less than a reference carbon footprint of a substantially identical reference method that utilizes a substantially identical amount of a reference foaming agent, and wherein the reference foaming agent only contains coal, metallurgic coke, or calcined petroleum coke (CPC).

13. The method of claim 12, wherein the reduced carbon footprint is characterized as at least 0.56 ton $CO_2$ less than the reference carbon footprint per ton of reclaimed olefin coke introduced into the molten steel.

14. The method of claim 12, wherein the reclaimed olefin coke is a by-product of a olefin production process.

\* \* \* \* \*